United States Patent Office 3,398,046
Patented Aug. 20, 1968

3,398,046
CHLORINATED POLYETHYLENE ADHESIVE COMPOSITIONS FOR BONDING PAPER TO NON POROUS SURFACES
John Lewin Fowler and Francis Raymond Sherliker, Widnes, England, assignors to Imperial Chemical Industries Limited, London, England, a corporation of Great Britain
No Drawing. Continuation of application Ser. No. 129,227, Aug. 4, 1961. This application Oct. 2, 1967, Ser. No. 672,403
Claims priority, application Great Britain, Aug. 26, 1960, 29,518/60
5 Claims. (Cl. 161—218)

ABSTRACT OF THE DISCLOSURE

A semi-permanent heat-sealing adhesive consisting essentially of chlorinated polyethylene, the pre-chlorinated polyethylene having a molecular weight within the range of 20,000 to 30,000 and the chlorinated polyethylene containing between 43% and 48% by weight of chlorine. The adhesive is applied to paper sheet for semi-permanent bonding to a non-porous solid surface, e.g. metal or resin sheet, which needs to be protected as, for instance, during transit. The paper sheet may be readily and cleanly removed from the non-porous surface when protection is no longer needed.

---

This application is a continuation of Ser. No. 129,227, filed Aug. 4, 1961, now abandoned, in the names of John Lewin Fowler and Francis Raymond Sherliker.

This invention relates to adhesive materials; more particularly it relates to thermoplastic adhesives and still more particularly to heat-sealing adhesives based on chlorinated polyethylenes and the use of such adhesives for bonding semi-permanently a protective paper to surfaces that require protection.

The surfaces of many articles, particularly articles in sheet form such as sheets of plastics, decorative resin-bonded boards, polished metal and glass, require protection during packing, transport and subsequent working such as cutting or shaping. Such protection is required to be only of semi-permanent nature and the application of a protective paper layer to the surface usually provides adequate protection. The paper must however adhere strongly to the surface that is to be protected but should be capable of being removed easily and cleanly once the need for protection is past. The problem thus resolves itself into providing an adhesive which will enable the protective paper to be applied easily and without damage to the surface which is to be protected, which will maintain a sufficiently strong bond between the paper and the protected surface for as long as is desired, and which will allow the paper to be stripped off cleanly when necessary.

Heretofore it has been the practice to use gelatine, or similar glues which will soften on wetting, to bond a protective paper to certain sheet materials such as polymethyl methacrylate, whereas with other materials for which no very suitable bonding agent was available it has been the custom to rely only on careful packing to guard against surface damage. Soaking in water to remove a water-softening glue is often objectionable and does not give clean removal of the protective paper and adhesive. On the other hand, when careful packing is relied upon for protection of uncovered sheets in transit, the problem of damage during subsequent handling still remains.

We have now found that chlorinated polyethylenes of certain compositions may be employed as heat-sealing adhesives which are very suitable for bonding semi-permanently a layer of protective paper to a material which has a substantially non-porous surface.

According to the present invention there is provided a heat-sealing adhesive which comprises a derivative of a polyethylene of molecular weight approximately 20,000–30,000, said derivatives containing between 40% and 50% by weight of chlorine.

There is furthermore provided within the scope of the invention a heat-sealing adhesive formulation which comprises a chlorinated polyethylene of a composition as defined hereinabove together with an organic solvent or other vehicle. Still further there is provided a paper sheet coated on one side with a heat-sealing adhesive of a composition as defined hereinabove, suitable for application to a solid surface for protection thereof against damage by abrasion.

The heat-sealing adhesives of the compositions stated hereinabove enable a paper sheet to be bonded quite firmly to a non-porous solid surface, but because of the nature of the adhesives, the paper can nevertheless be quite cleanly stripped from the solid surface when desired, leaving the solid surface uncontaminated with adhesive. We have found that the said adhesives are particularly suitable for semi-permanently bonding a protective paper layer to the surface of phenol-formaldehyde laminated paper board, decorative boards such as those with a melamine resin surface, rigid polyvinyl chloride sheets, polymethyl methacrylate sheets, glass, and metal surfaces such as chrominum plate, bright-rolled copper, and stainless steel.

We have found that for adequate adhesive effect the chlorinated polyethylene adhesive should contain 40–50% by weight of chlorine and the chlorinated derivative should be prepared from a polyethylene of molecular weight approximately 20,000–30,000. We prefer to employ a polyethylene of molecular weight approximately 30,000 and to have a chlorine content of 43–48% by weight in the adhesive prepared therefrom.

A very suitable method of employing the adhesive is first to coat a protective paper with the adhesive and then to apply the coated paper to the article to be protected. The type of paper is not at all critical, both unglazed kraft paper and white machine-glazed paper being entirely suitable. The adhesive may readily be applied to the paper by spreading a solution of the adhesive in an organic solvent such as toluene or a water emulsion of the adhesive over the paper surface by any one of the usual methods, for example roller-coating or spreading by means of a doctor blade. When the solvent or other vehicle has been allowed to evaporate, the coated paper is ready for use. The preferred amount of adhesive applied to the paper is 20–40 g./m.$^2$ dry weight of chlorinated polyethylene.

The chlorinated polyethylene adhesives are soluble in aromatic hydrocarbons such as toluene and xylene, chlorinated aliphatic hydrocarbons such as trichloroethylene, and ketones such as ethyl methyl ketone. These solvents and mixtures of such solvents may be used to prepare adhesive solutions for coating paper. Solutions containing at least 30% by weight of the adhesive can be prepared, but such solutions are very viscous and for machine coating of paper a 10–20% solution is usually most suitable.

When a low viscosity adhesive formulation is required, the adhesive may be emulsified in water. This can readily be accomplished by conventional techniques for making emulsions, for example by dissolving the chlorinated polyethylene adhesive in an organic solvent, mixing the solution with water containing about 1% by weight of an emulsifying agent (preferably an alkyl benzene sulphonate) and passing the mixture through a homogeniser.

The resultant emulsion may be concentrated to higher solids content by evaporation of most of the organic solvent. The following example illustrates the preparation of such an emulsion, which is suitable for paper coating on conventional machines:

15 parts by weight of chlorinated polyethylene adhesive containing 47% chlorine were dissolved in 85 parts of toluene. 25 parts by weight of the solution were added to 10 parts of water containing 1% by weight of sodium dodecylbenzene sulphonate and the mixture was passed twice through a homogeniser. The resultant emulsion was stirred continuously and distilled at atmospheric pressure until it contained only about 6% by weight of toluene. The solids content (chlorinated polyethylene) was then 26%.

The adhesive-coated paper is applied to the surface to be protected at an elevated temperature. The higher the temperature to which the adhesive is heated the lower the pressure that is needed to effect a satisfactory bond. Also, at a given temperature, the higher the pressure the shorter need be the time during which the pressure is applied. We have obtained satisfactory bonds by heating the adhesive-coated paper in contact with the surface to be protected at 80° C. in a press under a pressure of 120 lb./in.$^2$ for about one second, and also by heating the adhesive-coated paper in contact with the surface to be protected at 120° C. under a pressure of 10–20 lb./in.$^2$ for two to three seconds. Suitable conditions for effective bonding can also be attained by first preheating the adhesive-coated paper, for example by infra-red radiation, and then applying it to the surface to be protected with for example a rubber-covered roller, or by using heated rolls.

Because the adhesives of the invention are not adversely affected by temperatures commonly used in the curing of thermosetting resins, they may be employed for the protection of laminated board surfaces during the later stages of manufacture as well as during subsequent handling of the finished boards. For example boards with a decorative surface finish are commonly manufactured by resin-bonding a decorated surface layer to a supporting board by heat-curing in a press. Protection of the decorative surface can be secured by placing together in the press the supporting board, the decorative surfacing board, and an adhesive-coated paper with the adhesive in contact with the decorative surface. Heat-sealing of the paper to the decorative surface then takes place during heat-curing of the board lamination in the press, and the paper can remain in situ on the board to give continued protection after removal from the press.

We claim:

1. A laminated structure comprising a paper sheet semi-permanently bonded to a non-porous solid surface, said sheet being bonded to said surface by a semi-permanent heat-sealing adhesive consisting essentially of chlorinated polyethylene, the pre-chlorinated polyethylene having a molecular weight within the range of 20,000 to 30,000 and said chlorinated polyethylene containing between 43% and 48% by weight of chlorine, whereby said paper sheet protects said solid surface but may be readily and cleanly removed therefrom when protection is no longer needed.

2. A laminated structure according to claim 1 comprising a paper sheet semi-permanently bonded to a non-porous solid surface, said sheet being bonded to said surface by a semi-perament heat-sealing adhesive consisting essentially of chlorinated polyethylene, the pre-chlorinated polyethylene having a molecular weight of approximately 30,000 and said chlorinated polyethylene containing between 43% and 48% by weight of chlorine, whereby said paper sheet protects said solid surface but may be readily and cleanly removed therefrom when protection is no longer needed.

3. A laminated structure according to claim 2 wherein the non-porous surface is resin sheet.

4. A laminated structure according to claim 2 wherein the non-porous surface is metal.

5. A laminated structure according to claim 2 wherein the amount of adhesive is 20–40 g./m.$^2$ of paper.

References Cited

UNITED STATES PATENTS 2,959,562 11/1960 Klug _____ 260—96
2,975,074 3/1961 Jankens et al.

FOREIGN PATENTS 481,515 3/1938 Great Britain.

MORRIS LIEBMAN, *Primary Examiner.*

J. E. CALLAGHAN, *Assistant Examiner.*